(12) United States Patent
Moore

(10) Patent No.: US 7,143,027 B2
(45) Date of Patent: Nov. 28, 2006

(54) SENTENCE REALIZATION SYSTEM FOR USE WITH UNIFICATION GRAMMARS

(75) Inventor: Robert C. Moore, Mercer Island, WA (US)

(73) Assignee: Microsoft Corporation, Redmond, WA (US)

( * ) Notice: Subject to any disclaimer, the term of this patent is extended or adjusted under 35 U.S.C. 154(b) by 941 days.

(21) Appl. No.: 10/325,946

(22) Filed: Dec. 20, 2002

(65) Prior Publication Data

US 2004/0122654 A1 Jun. 24, 2004

(51) Int. Cl.
*G06F 17/27* (2006.01)

(52) U.S. Cl. .......................................... 704/9
(58) Field of Classification Search .................... None
See application file for complete search history.

(56) References Cited

U.S. PATENT DOCUMENTS

| 5,083,268 | A | * | 1/1992 | Hemphill et al. ............. 706/11 |
| 5,297,040 | A | * | 3/1994 | Hu ................................. 704/9 |
| 6,128,596 | A | * | 10/2000 | Mackie ........................ 704/257 |
| 6,985,852 | B1 | * | 1/2006 | Wang ............................. 704/9 |

OTHER PUBLICATIONS

Claudia Crimi, A. Guercio, G. Pacini, G. Tortora, and M. Tucci, "Automating Visual Language Generation," IEEE Trans. Software Engineering, vol. 16, iss. 10, pp. 1122-1135, Oct. 1990.*

Douglas E. Appelt 1987, "Bidirectional Grammars and the Design of Natural Language Generation Systems". pp. 206-212.

Chris Brew 1992, "Letting the Cat Out Of The Bag: Generation for Shake-and-Bake MT". 9 pages.

John Carroll et al., 1999, "An Efficient Chart Generator for (Semi-)Lexicalist Grammars". 9 pages.

John Dowding et al., 1993, "GEMINI: A Natural Language System for Spoken-Language Understanding". 8 pages.

Jay Earley 1970, "An Efficient Context-Free Parsing Algorithm". pp. 94-102.

Martin Kay 1996, "Chart Generation" pp. 200-204.

Stuart M. Shieber 1988. "A Uniform Architecture for Parsing and Generation" pp. 614-619.

Stuart M. Shieber et al., 1990. "Semantic-Head-Driven Generation" pp. 30-42.

Stuart M. Shieber 1993. "The Problem of Logical-Form Equivalence" pp. 179-190.

* cited by examiner

*Primary Examiner*—Donald L. Storm
(74) *Attorney, Agent, or Firm*—Joseph R. Kelly; Westman, Champlin & Kelly, P.A.

(57) ABSTRACT

The present invention is a method and system for identifying or realizing an output sequence using a grammar that can be used to encode semantic representation of the output. A goal incorporating a semantic representation is obtained and rules in the grammar are identified as having semantic representation components that can be matched with semantic representation components of the goal or portions thereof. The output sequence is realized based on the rules identified.

37 Claims, 7 Drawing Sheets

SENTENCE REALIZATION SYSTEM FOR USE WITH UNIFICATION GRAMMARS

BACKGROUND OF THE INVENTION

The present invention relates to natural language sentence realization. More specifically, the present invention relates to a system and method for realizing sentences wherein the system and method are complete for a general class of unification grammars.

In natural language processing, grammars describe a syntactic structure which is a breakdown of phrases, and a description of how those phrases combine into larger units, such as sentences. One grammar formalism has the expressive power of definite clause grammar (such as that described in F. Pereria and S. Shieber *Prolog and Natural-Language Analysis*, Center for the Study of Language and Information, Stanford University, Stanford Calif., (1987)). Another such grammar is provided in a syntactically modified form and is described in H. Alshawi, *The Core Language Engine*, The MIT Press, Cambridge, Mass. (1992), or J. Dowding et al., *Gemini: A Natural Language System For Spoken-Language Understanding*, Proceedings of the 31st Annual Meeting of the Association for Computational Linguistics, pp. 54–61, Columbus, Ohio (1993).

An example of a grammar rule (which may also be called a grammar production) found in this sort of grammar is as follows:

s:[stype=decl]→np:[prsn=P, num=N]vp:[vtype=tensed, prsn=P, num=N]

This notation reflects that of an augmented phrase structure rule, where nonterminals are complex category expressions having the form of a major category symbol followed by a bracketed list of feature constraints. Atomic values beginning with uppercase letters are variables, while those beginning with lowercase letters are constants.

The bracketed list of feature constraints are of the form "feature=value". In the class of grammars referred to as unification grammars, the constraints can be expressed in a more abstract manner than simply providing a specific value for a feature. Instead, the constraints can be expressed as a variable value which can also appear in other places in the grammar rule. Thus, unification constraints are indicated by shared variable values.

More specifically, the sample rule given above is interpreted to mean that a sentence (represented by "s") is of a declarative sentence type (represented by the bracketed feature constraint "stype-decl"), and the declarative sentence can be a noun phrase (represented by "np") followed by a tensed verb phrase (indicated by "vp" with the feature constraint "vtype=tensed"). The rule also indicates that the person and number of the noun phrase are equal to the person and number of the verb phrase, respectively (which is indicated by the "prsn=P" and the "num=N" expressions in both the noun phrase and verb phrase).

The types of grammar formalisms discussed herein extend from that given above to a formalism that not only describes the syntactic structure but also maps between the syntactic structure and a semantic representation of the syntactic structure (i.e., it maps to the meaning of the syntactic structure). The present discussion proceeds by using, as one example of such a semantic representation, a logical form. However, it should be noted that any other semantic representation can be used as well, and the present invention is not to be limited to a logical form semantic representation.

To extend the formalism of the grammar rule written above to incorporate semantic specifications, a principal logical form is assigned to each phrase. The nonterminals are thus augmented with a logical form (LF) specification separated by the symbol "/", as follows:

s:[stype=decl]/VP_se→np:[prsn=P, num=N]/NP_sem vp: [vtype=tensed, prsn=P, num=N, sub=NP$_{13}$ sem]/ VP_sem The rule now states that the LF of the sentence ("VP_sem") is the same as the LF of the verb phrase ("VP_sem"). The rule also states that the LF of the noun phrase ("NP_sem") is unified with the "sub" (which stands for "subject") feature in the bracketed list of features of the verb phrase. Thus, the assumption is that the verb phrase has as its LF something that looks the same as the LF of an entire sentence, except that the subject has not yet been specified. The subject will be represented in the LF by a variable, the value of which is the overall semantic representation (i.e., the LF) of the noun phrase.

From this example, it can be seen that phrases will have a principal LF, but can also have LF-valued features, such as the "sub" feature in the verb phrase. These LF-valued features can be used to pass information into the phrase. All such LF-valued features are declared as such by the author of the grammar. Collectively, the principal LF and LF-valued features of a nonterminal will be referred to as the LF components of the nonterminal.

Lexical items (i.e., words) are introduced by rules such as the following:

vp:[vtype=tensed, prsn=3, num=sg, sub=S]/sleep (S)→'sleeps' np:[prsn=3, num=sg]/sue→'Sue'

The first of these rules says that "sleeps" is a third person, singular, tensed verb phrase, whose LF is of the form "sleep(S)", where "S" is the value of the "sub" feature. The second rule says that "Sue" is a third person, singular noun phrase, whose LF is "sue".

The notation used above is one particular notation for describing grammars that specify meanings of linguistic expressions. Note that the methods discussed herein, including the methods of the present invention, can be applied to grammars using a wide variety of notations, and that the notation used herein is merely exemplary.

The term "unification" as used herein refers to matching two expressions by finding a most general substitution instance of the expressions, which can be partially specified. For example, the following two term expressions are partially specified (meaning that they have variables in them):

f(X,g(X),U)

f(a,g(Y),V)

The process of unifying these two expressions is the process of finding a most general substitution for the variables that make the two expressions identical. In this case, in order to make the two expressions identical, the following substitutions must be made:

X=Y=a; and

U=V=z

It should be noted that since both "U" and "V" are variables, they need not be substituted with a particular value, but must be replaced by a common variable reference. Therefore, the unification of the two expressions identified above is written as follows:

f(a,g(a),Z)

It should be noted that in unifying two or more variables, any variable may be substituted for the original variables as long as that variable does not have an occurrence anywhere else in the larger expressions being unified that is not required to be unified with those variables. For example, if we unify "f(A,B)" with "f(C,D)", we can use any variables we like to unify "A" with "C" and "B" with "D", as long as we do not use the same variable. Thus we can express the result of the overall unification as "f(A,B)", "f(C,D)", "f(E, F)", etc., but not "f(A,A)", "f(B,B)", etc. The most general substitution instance unifying two terms can be proved to be unique, except for this freedom in choosing names for the variables. A substitution function that unifies two expressions as described herein is referred to as a "most general unifier".

It should also be noted that when a subexpression of a larger expression is unified or instantiated, in such a way that variables in the subexpression become instantiated (i.e., receive values), all occurrences of those variables in the larger expression are simliarly instantiated. For example, when we speak herein of a logical form component of an edge or a rule being unified or instantiated, it should be understood that any occurrences of variables within the rule or edge, but outside the logical form component, are instantiated to the same value they receive as a result of occurrences of those variables being unified or instantiated inside the logical form component.

The type of unification described above is called "term unification". We also require the notion of "feature structure unification" to unify linguistic category expressions incorporating "feature=value" constraints. While terms are unified by unifying corresponding parts identified by position, feature structures are identified by unifying corresponding parts identified by feature name. Moreover, features not explicitly mentioned in a feature structure are interpreted to be unconstrained, which is equivalent to having as a value a variable which occurs nowhere else.

For example, unifying the terms "f(A,B)" and "f(x,y)" requires unifying "A" with "x" and "B" with "y", because they occupy corresponding positions in the overall terms. Unifying the category expressions "c:[f1=A, f2=B, f3=foo]" and "c:[f2=x, f1=y, f4=bar]" requires unifying "A" with "y" and "B" with "x", because they are values of corresponding features, even though they are not in corresponding positions as we have chosen to write these category expressions. Moreover, the resulting expression would incorporate the constraints "f3=foo" and "f4=bar", which could be written as "c: [f1=x, f2=y, f3=foo, f4=bar]", or alternatively written using any other permutation of the given constraints on the features "f1", "f2", "f3", and "f4".

In all the examples we give below, we assume that all feature values are terms to be unified by term unification, but the same methods apply if feature values are allowed to be feature structures, so long as feature structure unification is used in place of term unification.

It should also be noted that, as is well known to those skilled in the art, feature unification can be replaced by term unification if all feature structures are converted to terms, by assigning each feature a fixed position in a term structure. The corresponding feature values are assigned these positions, and the feature names are omitted. For example the expression "c: [f1=a, f2=a]" can be replaced by "c(a,b,X, Y)", if the features "f1", "f2", "f3" and "f4" are always respectively assigned the first through fourth argument position of a term headed by the functor "c", and these are the only features associated with the functor "c".

As a more concrete example of unification in the context of unification grammar, for the two rules set out above that introduce the words "sleeps" and "Sue", the nonterminal expression for "Sue" can be unified with the noun phrase daughter of the sentence rule, and the nonterminal expression for "sleeps" can be unified with the verb phrase daughter of the sentence rule. This will cause the principal LF of the noun phrase ("Sue") to be unified with the "sub" feature of the verb phrase, which will instantiate the principal LF of the verb phrase to "sleep(sue)" which will in turn become the LF of the entire sentence.

This type of unification-based grammar can be used for parsing employing any of a number of well-known methods. Such a grammar will associate every well-formed sentence with one or more semantic representations (e.g., LFs) representing possible meanings of the sentence. Such grammars can also be used for sentence realization, that is, given a well-formed LF, realizing one or more text strings whose meaning is represented by the LF.

A large body of work has been done on both types of algorithms (both parsing and realization). Similarly, work has been done in an attempt to develop algorithms such that a single grammar can be used for both parsing and realization. One realization algorithm that is designed to use a grammar that can also be used for parsing is described in S. Shieber, *A Uniform Architecture for Parsing and Generation*, Proceedings of the 12$^{th}$ International Conference on Computational Linguistics, pp. 614–619, Budapest, Hungary (1988).

In order to discuss the Shieber algorithm in greater detail, a brief description of the concepts of charts and edges should be made. These concepts are well-known in chart parsing. The chart can be any a data structure that stores records (edges—also called items, dotted rules, or states) that record partial analyses of a segment of an input string. These partial analyses are combined to reach a final analysis of the entire string.

In the present context, the chart and edges are slightly different, because the goal is to start with an LF and build up phrase records for it to obtain a sentence (or other output sequence) that has the specified LF as its meaning. Therefore, edges in the chart represent grammatical phrase types that can realize a particular portion of an LF. To generate a sentence, the system starts with a goal LF and each edge in the chart will have a piece of the goal LF as its meaning. Therefore, when the analysis is completed, the edges in the chart can be traced to find all individual words in the order that they must be in, in order to construct the text string.

The algorithm described in the Shieber reference is based on a predictive algorithm for parsing such as that set out in J. Earley, *An Efficient Context-Free Parsing Algorithm*, Communications of the ACM, 13(2) 94–102 (1970). However, when used for sentence realization, this type of predictive algorithm frequently fails to pass along any semantic constraints. Also, in Shieber's algorithm, at all stages of processing, Shieber checks the principal LF of a phrase to ensure that it is unifiable with some goal LF subexpression, but the algorithm does not instantiate edges in this process. This has two significant disadvantages. First, it greatly increases the number of possible distinct completed and complete edges, since for every possible full instantiation of an LF component of a completed edge, Sheiber also allows all possible generalizations of that instantiation. Second, Sheiber's algorithm also greatly increases the number of LF expressions that must be examined to ensure compatablilty with the goal LF. Since the LF expressions remain only partially instantiated, they must be rechecked as they are percolated from edge to edge, since they might become further instantiated in ways incompatable with any goal LF subexpression.

In sum, given a unification-based grammar that associates every well-formed sentence with one or more logical forms (LFs), it has been very difficult to develop a general algorithm that efficiently enumerates all the well-formed sentences that have a given LF as the representation of their meaning.

SUMMARY OF THE INVENTION

The present invention is a method and system for identifying or realizing an output sequence using a grammar that can be used to encode semantic representations of the output. A generation goal incorporating a semantic representation is obtained and rules in the grammar are identified as having semantic representation components that can be matched with semantic representation components of the goal or portions thereof. The output sequence is realized based on the rules identified.

In one embodiment, a set of rules is identified in which all nonvariable semantic representation components of the identified rules can be instantiated to well-formed subexpressions of the goal semantic representation components. Corresponding initial edges are placed in a chart. Edges in the chart are recombined with each other to produce additional incomplete, completed, and complete edges.

Completed edges are placed in the chart for each instantiation of the completed edge in which nonvariable semantic representation components of the expression representing the overall grammatical category and meaning of the completed edge are instantiated to the enumerated subexpressions of the goal semantic representation components.

The present invention also handles semantic equivalence of distinct semantic representations by introducing a notation in semantic representations for special lists of elements that can be re-ordered without changing the meaning of the semantic representation. The process of unification is then modified so that semantic representations incorporating such lists of elements can be unified, regardless of the order of those elements. In order to maintain completeness of the generation algorithm, when the well-formed subexpressions of the goal semantic representation components are enumerated, all subsets of each special-list subexpression are enumerated as well, maintaining the order of the elements in the original list.

DETAILED DESCRIPTION OF ILLUSTRATIVE EMBODIMENTS

The present invention relates to a system and method of realization of desired output using a grammar that can be used to encode semantic representations of the output. However, prior to discussing the invention in greater detail, the discussion proceeds with a description of one illustrative environment in which the present invention can be practiced.

Figure 1:
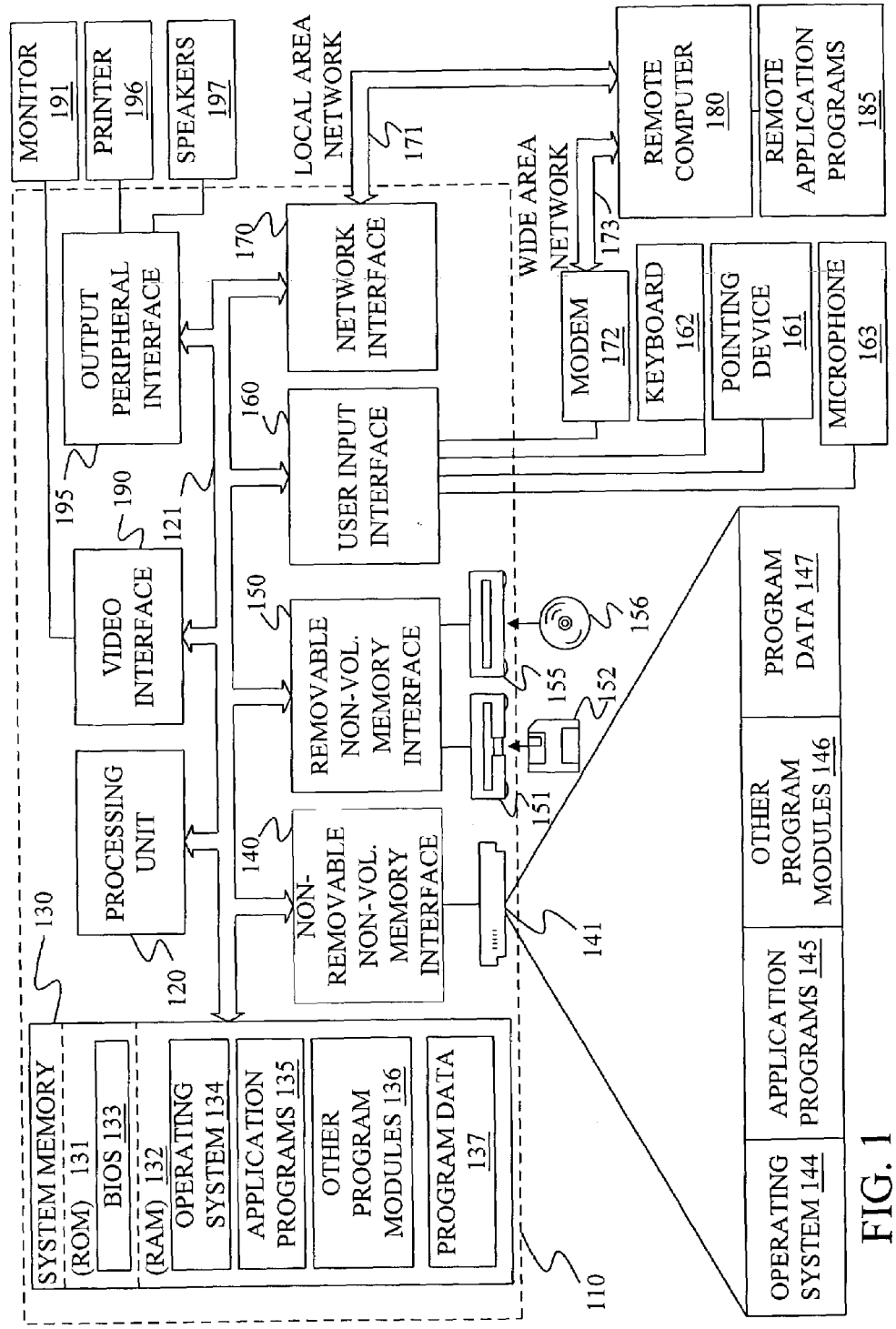
FIG. 1 is a block diagram of one illustrative environment in which the present invention can be practiced.

FIG. 1 illustrates an example of a suitable computing system environment 100 in which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during startup, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies.

A user may enter commands and information into the computer 110 through input devices such as a keyboard 162, a microphone 163, and a pointing device 161, such as a mouse, trackball or touch pad. Other input devices (not shown) may include a joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computer 110 may operate in a networked environment using logical connections to one or more remote computers, such as a remote computer 180. The remote computer 180 may be a personal computer, a hand-held device, a server, a router, a network PC, a peer device or other common network node, and typically includes many or all of the elements described above relative to the computer 110. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on remote computer 180. It will be appreciated that the network connections shown are exemplary and other means of establishing a communications link between the computers may be used.

Figure 2:
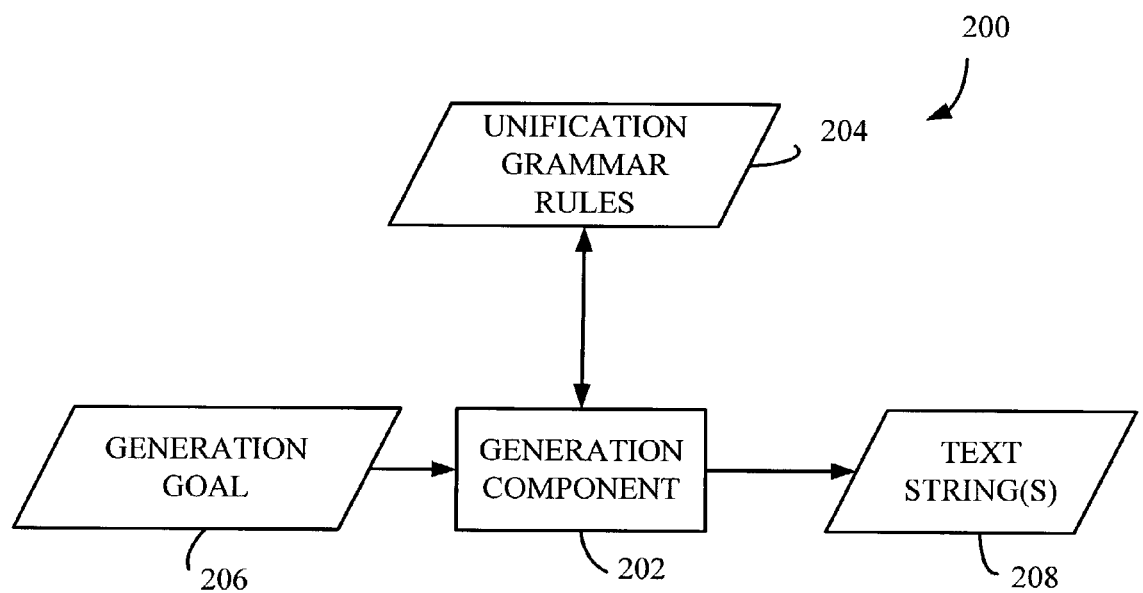
FIG. 2 is a more detailed block diagram of a sentence realization system in accordance with one embodiment of the present invention.

FIG. 2 is a block diagram of a sentence realization system 200 in accordance with one embodiment of the present invention. System 200 includes a generation component 202 that accesses unification grammar rules 204 in a unification grammar such as that described in the background portion. Generation component 202 receives a generation goal 206 and processes the goal 206, using grammar rules 204, into one or more text strings 208, such as sentences.

In other embodiments of the present invention, sentence realization system 200 may produce output sequences other than text strings. For example, if used in an application requiring speech generation rather than text generation, the system may be provided with a set of grammar rules 204 that cause it to produce output consisting of sequences of tokens representing phonetic symbols intended as input to a speech synthesizer.

In yet other embodiments of the present invention, the process of unification as formally defined previously may be replaced by other forms of matching and instantiation. As will be recognized by those skilled in the art, the present invention can be applied using a wide variety of methods of matching and instantiation. For example, the present invention can be applied using matching without the so-called "occurs check", wherein a variable such as "X" is allowed to match a term containing itself, such as "f(X)", which is not permitted by unification, strictly defined.

The generation goal 206 incorporates a semantic representation (such as an LF) specifying the meaning of the text string to be generated. In some embodiments of the present invention, the generation goal also specifies a grammatical category that the text string is required to exemplify. If a grammatical category is not specified, in some embodiments the text strings 208 will include strings of all grammatical categories that can have the LF specified in generation goal 206. In other embodiments, the text strings 208 will exemplify some fixed grammatical category, such as a complete sentence. In the following discussion, we will assume that the generation goal always incorporates a grammatical category expression. In an embodiment where all possible grammatical categories are desired, this grammatical category expression can be an unconstrained variable. In an embodiment where a fixed grammatical category is desired, it can be an expression for that specific grammatical category.

Prior to describing the processing of sentence realization system 200 in greater detail, a number of the abstract data structures used in accordance with one embodiment of the present invention will be described. The present system is a form of bottom-up chart generation. Like chart parsing, chart generation builds a collection (referred to as a chart) of data structures (referred to as edges) which represent application (or possibly partial application) of grammar rules to previously analyzed phrases. In accordance with one embodiment of the present invention, assume that "A" is a nonterminal and "X" is a nonterminal or terminal, "α" and "β" are (possibly empty) sequences of terminals or nonterminals. In the embodiments of the present invention described below, a terminal is simply a word; but in other embodiments it could be a word stem plus morphological features or any other abstract representation that determines a word, a class of equivalent words, or any other desired output token. A nonterminal is an abstract category and comprises a grammatical category description and a semantic specification (e.g., an LF). For example, a nonterminal can take the following form:

np:[prsn=P, num=N]/NP_sem

This nonterminal describes a noun phrase whose person feature "prsn" has the value "P", whose number feature "num" has the value "N", and whose LF has the value "NP_sem".

A complete edge "⟨A⟩" means that a complete analysis (including words) of the nonterminal "A" has been generated. One example of a complete edge given the examples discussed in the Background portion is as follows:

⟨s:[stype=decl]/sleep(sue)⟩

An incomplete edge "⟨A→α.Xβ⟩" means that the sequence of nonterminals and and/or words "α" has been generated, and if the sequence of nonterminals and/or words "Xβ" is generated, then nonterminal "A" will have been generated.

A special case of an incomplete edge is referred to as an initial edge. An edge is an initial edge if it has the form of an incomplete edge, but a is empty. Thus, an initial edge has the form "⟨A→.Xβ⟩" which means that if everything covered by the sequence of terminals or nonterminals "Xβ" is built, the nonterminal "A" will also be built.

A completed edge "⟨A→α.⟩" means that the sequence of nonterminals and/or words "α" has been generated, which results in the nonterminal "A" having been generated.

Note that in certain publications of prior art, incomplete edges have been called "active edges" and what we call "completed edges" have variously been called "inactive edges", or even "complete edges" in works that do not make our distinction between complete and completed edges.

It can be seen that a primary difference between these edges and those in chart parsing is that there are no string position indices since they are not needed to constrain generation. Instead, the nonterminals incorporate LF components to indicate what LFs have had strings generated for them, and this guides the generation process the way string positions guide parsing.

It can also be seen that, in this formalism, semantic content is attached to nonterminals in grammar rules, rather than directly to words. Therefore, there is no need to have any complete edges in the chart for lexical items. Instead, as is described in greater detail below, lexical "scanning" rules allow the system to hypothesize any word wherever it is needed, by simply "moving the dot" located in an incomplete edge to the right, past any word that occurs immediately to its right.

Figure 3:
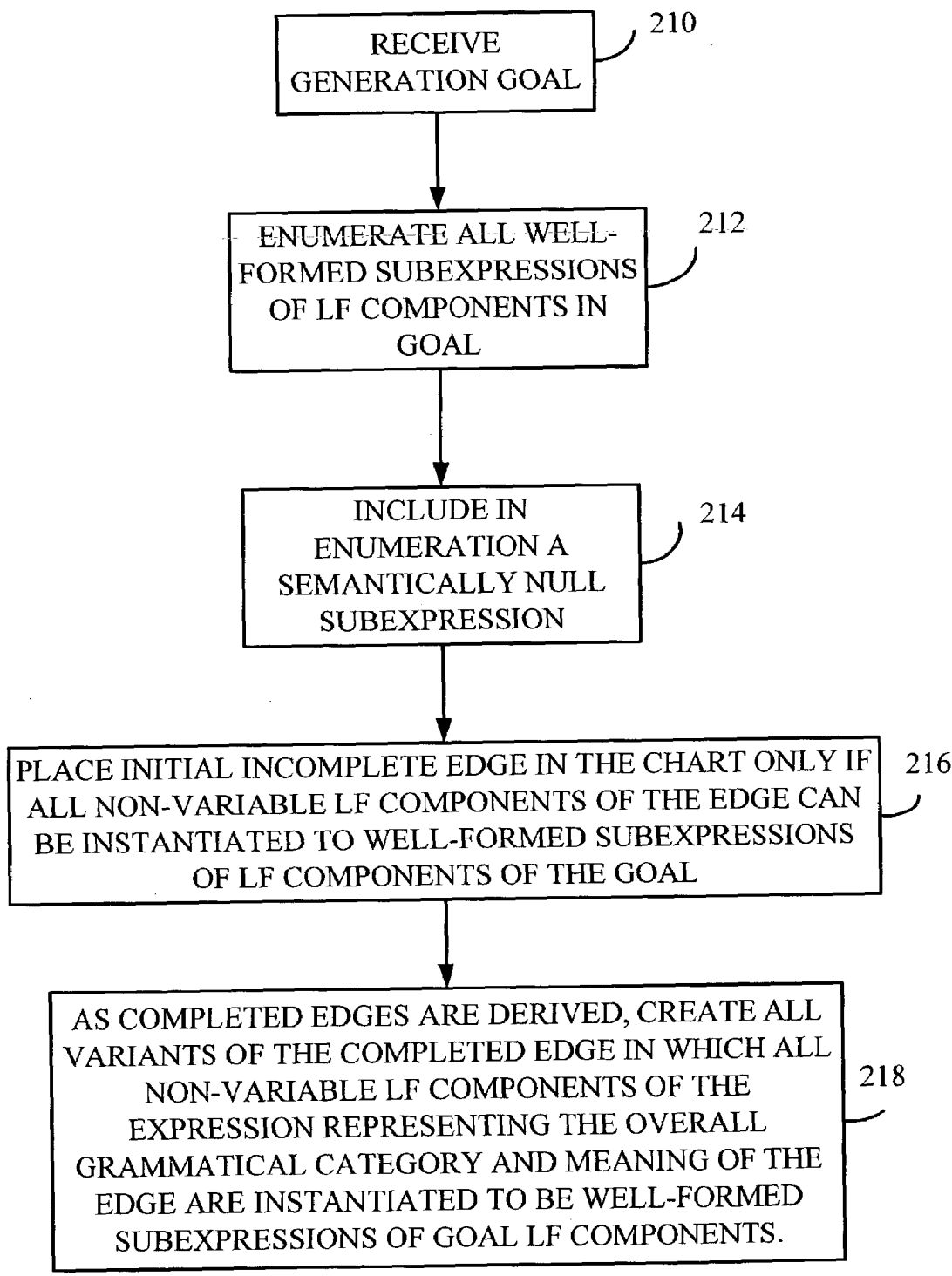
FIG. 3 is a flow diagram illustrating one embodiment of a chart generation process in accordance with the present invention.

FIG. 3 is a flow diagram which illustrates an embodiment of system 200 in greater detail. First, system 200 receives generation goal 206, this is indicated by block 210 in FIG. 3.

Next, generation component 202 enumerates all well-formed subexpressions of LF components in the goal 206. This is indicated by block 212 in FIG. 3. The LF components include not only the overall goal LF (or principal LF) but also the LF expressions that can be found in the grammatical category specification. Collectively, these are referred to as goal LF components. By way of example, assume that the following is a well-formed subexpression of the goal LF components:

f(a,g(a),b)

Then the following are also well-formed subexpressions of the goal LF components and are hence enumerated:

a g(a)

b

Note that the well-formed subexpressions of an LF expression include the entire LF expression itself.

In the enumeration of the well-formed subexpressions, component 202 includes an enumeration of a semantically null token. This is indicated by block 214. The semantically null token is enumerated because the grammar may be required to support words or phrases which have no semantic meaning. For example, in the sentence "Oh my goodness, I didn't realize you were here." The exclamation "Oh my goodness" might be regarded as semantically null. Therefore, a distinguished token representing the null meaning is enumerated as a well-formed subexpression of the goal LF components.

Once all of these subexpressions have been enumerated, they are used to filter the way that edges are derived. As initial incomplete edges are generated, an initial incomplete edge is placed in the chart only if it is possible to instantiate all nonvariable LF components of the edge to well-formed subexpressions of the goal LF components. This is indicated by block 216 in FIG. 3. This filters from consideration any initial edges that have some LF expression in them that does not appear anywhere in the goal, and that cannot be made into an LF expression that appears in the goal through instantiation.

For example, suppose the goal is:

s:[stype=decl]/restlessly(sleep(sue))

Also suppose that a lexical rule exists in the grammar that has an LF component associated with it that is "bill". Since "bill" does not appear anywhere in the goal, that particular lexical rule cannot be used, ultimately, in the generation process. Therefore, no initial edge corresponding to that lexical grammar rule will be placed in the chart.

In embodiments of the present invention based on unification, instantiating all nonvariable LF components of an expression to well-formed subexpressions of the goal LF components comprises simultaneously unifying all nonvariable LF components of the expression with well-formed subexpressions of the goal LF components. To understand why simultaneous unification is required, assume that a rule has several LF expressions which are partially instantiated. For example, suppose that a rule has two LF expressions "f(X)" and "g(X)". Assume also that the only occurrences of functors "f" and "g" in goal LF components are in the expression "h(f(a),g(b))".

If "f(X)" and "g(X)" are not considered together, they could be individually unified to be goal LF component subexpressions. However, when considered together, they cannot be simultaneously unified to be goal LF component subexpressions, unless "a" and "b" are unifiable, which they are not. Therefore, this step ensures that all initial edges placed in the chart could eventually contribute to the output sequence which the system is attempting to generate.

Next, as completed edges are derived, the system instantiates all nonvariable LF components of the expression representing the overall grammatical category and meaning of the completed edge (i.e., the nonterminals on the left of the arrow, in the present notation) to be well-formed subexpressions of the goal LF components, in all possible ways. Each of these possible instantiations of the completed edge is placed in the chart. If it is impossible to instantiate a completed edge in this way, nothing is placed in the chart. This is indicated by block 218. This step thus does not simply check to see whether it is possible to instantiate everything in a complete edge consistent with the goal LF components, but actually does instantiate the expression representing the overall grammatical category and meaning in all possible ways, only for the nonvariable LF components.

An example may be helpful. Assume that we desire to generate all strings for the goal:

s:[stype=decl]/restlessly(sleep(sue))

Assume further that a lexical rule exists as follows:

vp:[vtype=tensed,prsn=3, num=sg, sub=S]/sleep(S)→'sleeps'

This rule categorizes the word "sleeps" as a verb phrase with certain features and a principal LF, and in particular it has a principal LF whose value is the partially instantiated (i.e., nonvariable) LF expression "sleep(S)". The only way to unify "sleep(S)" with a goal LF component subexpression is to replace the "S" with "sue". By unifying the variable "S" with the value "Sue" a completed edge is instantiated as follows:

⟨vp:[vtype=tensed,prsn=3, num=sg, sub=sue]/sleep(sue)→'sleeps'.⟩

In general, there may be more than one way to instantiate the rule such that its nonvariable LF components become goal LF component subexpressions, and each of those instantiations is made. Here, however, there is only one way to instantiate the rule because the only goal LF component subexpression that unifies with "sleep(S)" is "sleep(sue)".

Notice that a side effect of instantiating "sleep(S)" to "sleep(sue)" is that "sub=S" becomes instantiated to "sub=Sue". The "S" in "sub=S" would not be instantiated on its own account, since it is a (completely) variable LF component, but instantiating the occurrence of "S" in "sleep(S)" results in instantiating the occurrence of "S" in "sub=S", since all occurrences of "S" in the rule must receive the same value.

An algorithm for constructing the chart in accordance with one embodiment of the present invention can also be described in terms of a schema. The description thus now proceeds in those terms. Let "I(E,θ)" denote a relation that associates with an expression "E" every substitution function "θ" that instantiates all nonvariable LF components of "E" with well-formed subexpressions of the LF components of the goal. In the following schema rules, "A", "B", "B'" and "C" represent nonterminals; "X" represents either a terminal or a nonterminal; "α", "β" and "γ" represent (possibly empty) sequences of terminals and nonterminals; "δ" represents a (possibly empty) sequence of terminals; "mgu" represents a fixed function such that "mgu(B,B')" represents a most general unifier of "B" and "B'".

The following mathematical schema rules represent the entire chart generation algorithm described with respect to FIG. 3 in accordance with one embodiment of the present invention. The interpretation of the symbol "⊢" is that for any way of matching the items to the left of "⊢", the items to the right of "⊢" can be added to the chart.

1a. $A \rightarrow \alpha B \beta, \exists \theta(I(A \rightarrow \alpha B \beta, \theta)) \vdash \langle A \rightarrow .\alpha B \beta \rangle$ 1b. $A \rightarrow \delta, I(A,\theta) \vdash \langle \theta(A \rightarrow \delta 5.) \rangle$ 2a. $\langle A \rightarrow \alpha.\delta X \beta \rangle \vdash \langle A \rightarrow \alpha \delta.X \beta \rangle$ 2b. $\langle A \rightarrow \alpha.\delta \rangle, I(A,\theta) \vdash \langle \theta(A \rightarrow \alpha \delta.) \rangle$ 3a. $\langle A \rightarrow \alpha.BC\beta \rangle, \langle B' \rangle, \sigma = mgu(B,B') \vdash \langle \sigma(A \rightarrow \alpha B.C\beta) \rangle$ 3b. $\langle A \rightarrow \alpha.B \rangle, \langle B' \rangle, \sigma = mgu(B,B'),$
 $I(A,\theta) \vdash \langle \theta(\sigma(A \rightarrow \alpha B.)) \rangle$ 4. $\langle A \rightarrow \alpha. \rangle \vdash \langle A \rangle$ Schema rule 1a illustrates the case in which a grammar rule has at least one nonterminal ("B") on the right-hand side. Rule 1a requires that there exist a substitution function "θ>" (which is a substitution function on the entire rule) that makes all LF expressions in the rule be well-formed subexpressions of the goal LF components. In rule 1a, if a "θ" exists, the substitution function is not applied, but the check corresponding to block 216 in FIG. 3 has been performed. The subject rule has simply been identified as one which could be useful in subsequent generation. Therefore, as stated in rule 1a, an initial edge corresponding to the rule is added to the chart.

Schema rule 1b applies to a grammar rule whose right-hand side consists only of terminals (e.g., words) or is empty. In this instance, the substitution functions are applied that satisfy the I relation (i.e., any substitution function "θ" is applied that makes all the nonvariable LF components of the left-hand side of the grammar rule "A" be subexpressions of the goal LF components). Once these substitutions functions have been applied to the grammar rule, a corresponding completed edge can be placed in the chart for each such function.

Schema rules 2a and 2b cover cases in which there is an incomplete edge in the chart whose next items to be matched are terminals. Rule 2a covers a case in which there is at least one additional item to match after the terminals, and Rule 2b covers a case where the terminals are the last items to be matched. In rule 2a, the terminals are assumed and a corresponding incomplete edge is added to the chart simply by moving the dot in the original incomplete edge past the terminals. For rule 2b, in addition to moving the dot, all substitution functions "θ" are found that instantiate the nonvariable LF components of the nonterminal on the left of the arrow to goal LF component subexpressions, these substitution functions are applied to the entire edge, and the resultant completed edges are added to the chart. In this step, the substitution functions "θ" are enumerated and the substitutions are actually performed to add an edge to the chart covering various ways of instantiating the edge.

Schema rules 3a and 3b address cases in which there is an incomplete edge in the chart whose next item to be matched is a nonterminal "B", and where there is also already a complete edge "⟨B'⟩" in the chart that can be combined with the incomplete edge by unifying "B" and "B'" by means of a most general unifier (mgu) σ. In rule 3a, σ is applied and the dot is moved to the right of "B" indicating that something matching "B" has been found.

Rule 3b is similar to rule 3a except that "B" is the last item to be matched to complete the edge. Thus, "σ" is applied as in rule 3a, but an additional step is also provided in which the appropriate substitution functions "θ" (those that instantiate the nonvariable LF components of the nonterminal on the left of the arrow to goal LF component subexpressions) are applied to produce corresponding completed edges.

Finally, in schema rule 4, a complete edge is created from each of the completed edges. The completed edge is illustrated on the left-hand side of the rule while the complete edge is illustrated on the right. "α" represents how the completed edge was created, and this is not included in the complete edge.

In accordance with an alternative embodiment of the present invention, complete edges are not used, and are thus not combinable with incomplete edges according to schema rules 3a and 3b. In this embodiment, schema rule 4 is eliminated and schema rules 3a and 3b are modified by replacing the complete edge expression "⟨B'⟩" with the completed edge expression "⟨B'→γ⟩", so that completed edges are directly combinable with incomplete edges. An implementation of this version of the schema may be less efficient than an implementation of the original schema, if there are many different instances of "⟨B'→γ⟩" with the same nonterminal "B'".

In accordance with another alternative embodiment of the present invention, schema rules 1b, 2b, and 3b do not apply, and may not check for the existence of, the substitution functions "θ" that instantiate the nonvariable LF components of the nonterminal on the left of the arrow to goal LF component subexpressions. Instead these substitution functions are computed and applied to complete edges in a modified version of schema rule 4.

To interpret this schema as an algorithm, according to one embodiment of the present invention, schema rules 1a–4 can be applied repeatedly, in all possible ways and in any order, until no more distinct applications of the rules can be made. Note that in some embodiments of the present invention, the process of adding edges to the chart is not continued to completion, but terminates when edges have been added sufficient to permit the extraction of the number of output sequences desired.

As applications of the rules add new edges to the chart, these edges may in turn trigger additional applications of schema rules. For example, application of rule 3b will produce one or more completed edges, each of which will trigger an application of rule 4 to produce a complete edge. The resulting complete edges may trigger additional applications of rules 3a or 3b. If, however, an application of a schema rule produces an edge that is subsumed by an edge already in the chart, the new edge is not added to the chart. (An expression "A" subsumes an expression "B" if "B", and every way of further instantiating "B", is unifiable with "A".) In accordance with one embodiment of the present invention, whenever an edge is added to the chart, any edges already in the chart that are subsumed by the new edge are removed.

Figure 4A:
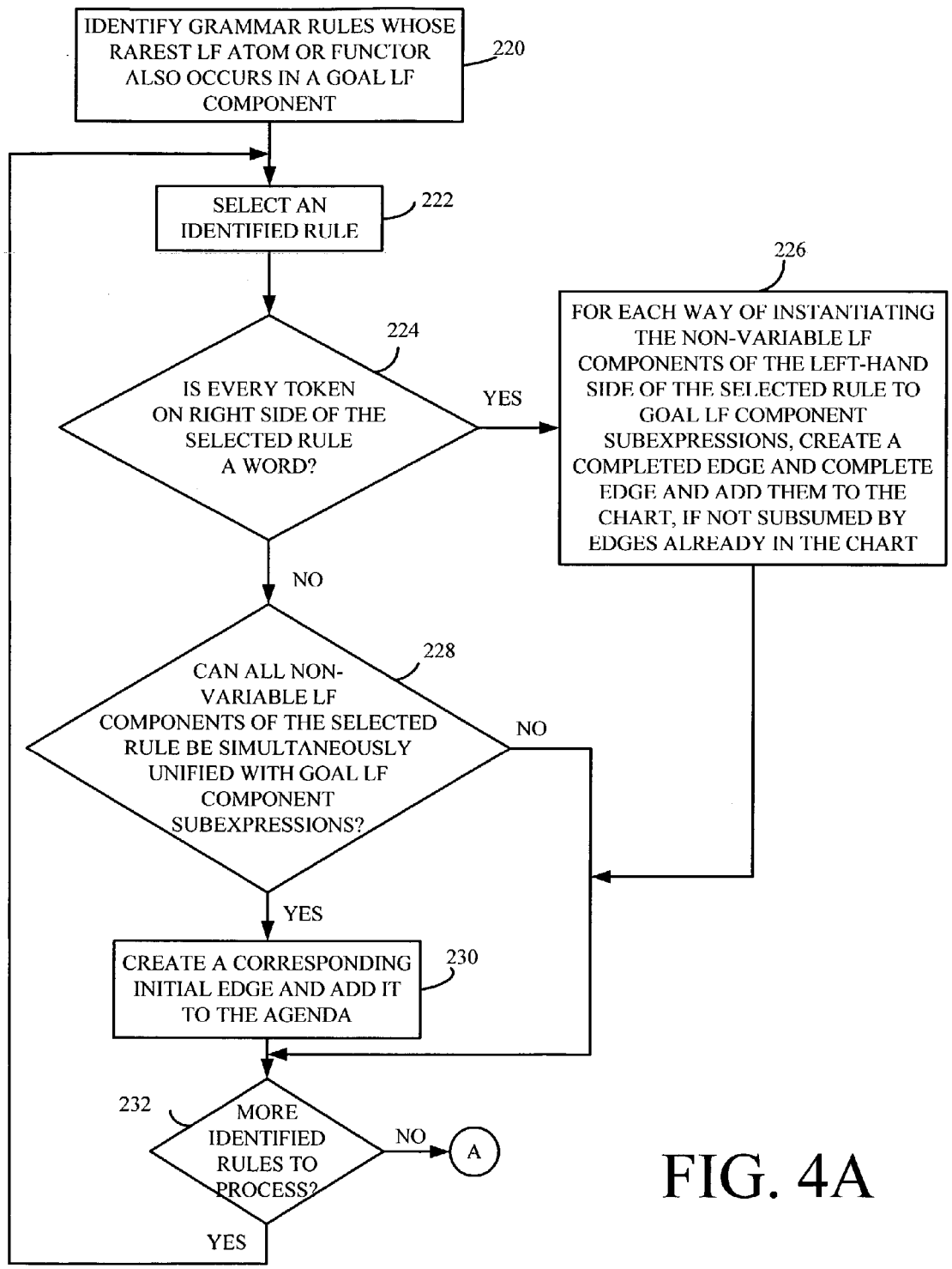
FIGS. 4A–4B are a more detailed flow diagram illustrating a more specific embodiment of the chart generation algorithm illustrated in FIG. 3.
Figures 1, 4B:
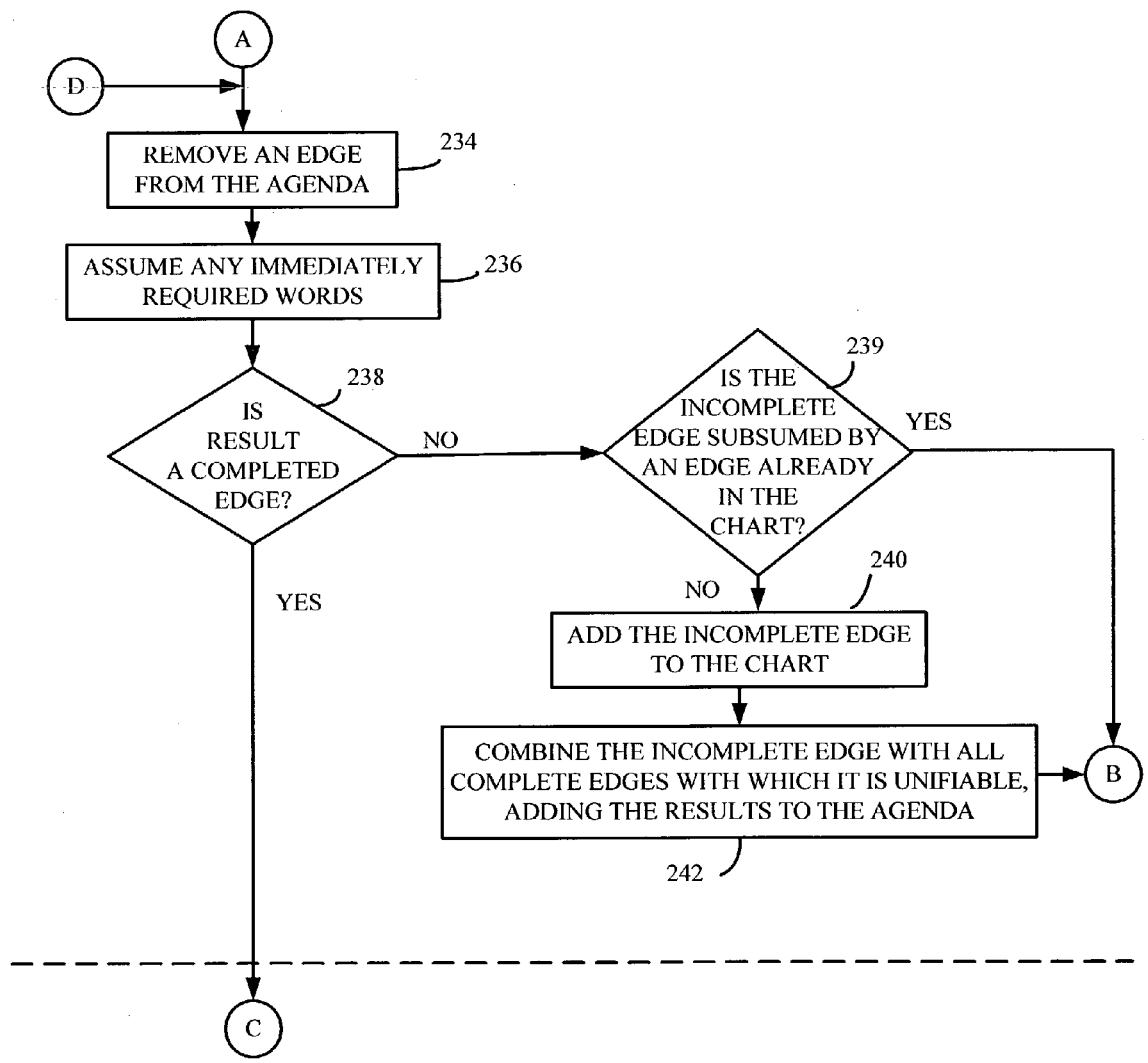
Figures 2, 4B:
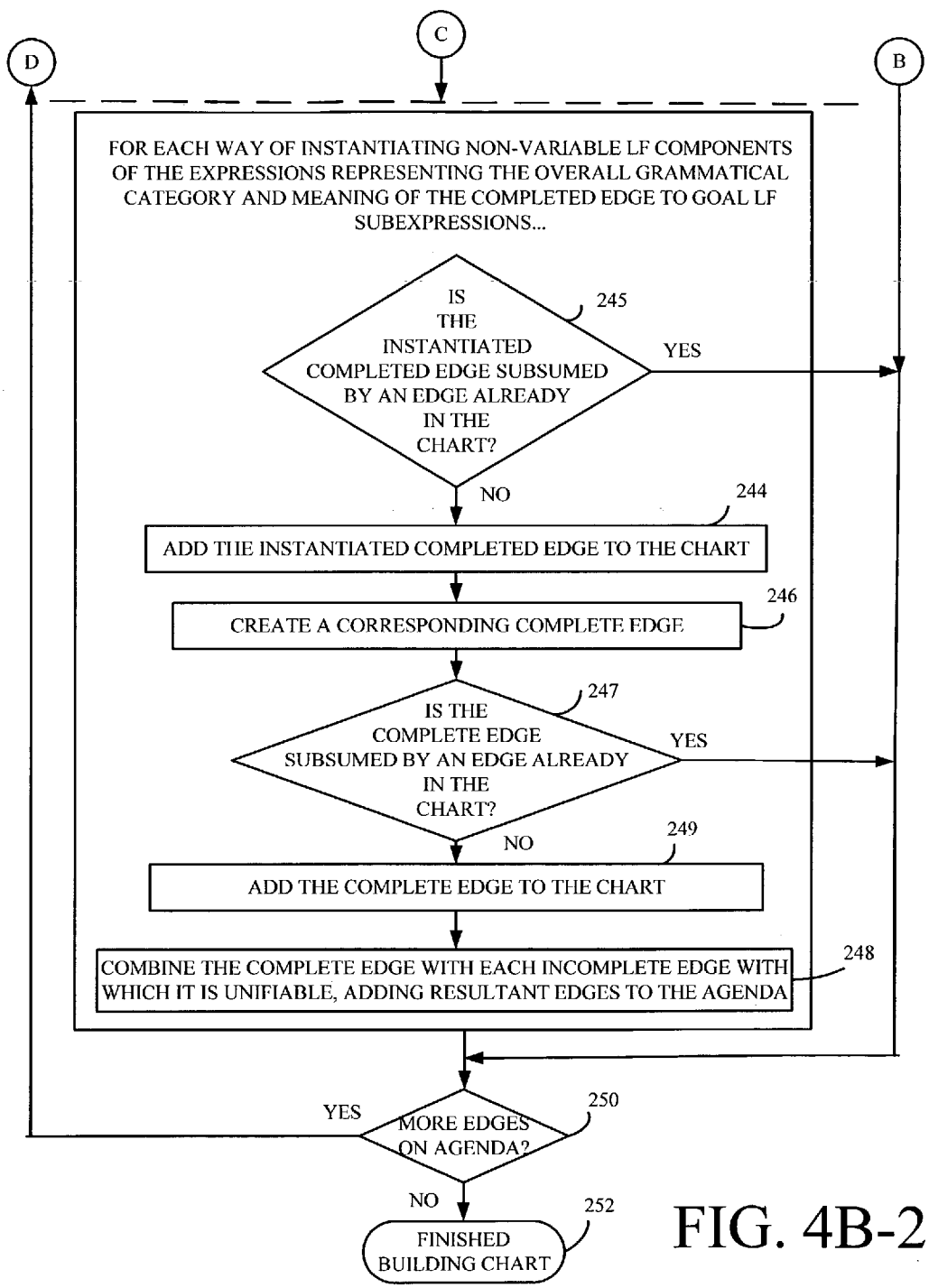

FIGS. 4A and 4B (which includes FIGS. 4B-1 and 4B-2, collectively referred to as FIG. 4B) show a flow diagram which illustrates the operation of this process in accordance with one embodiment of the present invention. In accordance with one embodiment of the present invention, not every rule in the grammar need even be checked as illustrated by block 216 in FIG. 3. Instead, the each rule of the grammar is indexed by its most rare atomic semantic representation token, e.g., LF atom or functor. By "most rare", we mean the LF atom or functor occurring in the rule that is included least frequently in the all the rules of the grammar. If the grammar rule contains no LF atoms or functors, (i.e., if all its LF components are variables), then the semantically null token is considered to be its most rare LF atom or functor. The first step shown in FIG. 4A is to identify the candidate grammar rules in the grammar whose rarest LF atom or functor also occurs in an LF component of the goal (including the semantically null token). This is indicated by block 220 in FIG. 4A.

Next, generation component 202 selects one of the identified candidate rules. This is indicated by block 222. It is then determined whether every token on the right hand side of the selected rule is a word. This is indicated by block 224 in FIG. 4A. If so, then for each way of instantiating the nonvariable LF components of the left-hand side of the selected rule to goal LF component subexpressions, a completed edge is created, along with an associated complete edge and the completed edge and complete edge are added to the chart, if they are not subsumed by edges already in the chart. This is indicated by block 226. Therefore, it can be seen that this implements rule 1b.

If, at block 224, not all tokens on the right hand side of the selected rule are words, then it is determined whether all nonvariable LF components of the selected rule can be simultaneously unified with goal LF component subexpressions. This is indicated by block 228. If so, then a corresponding initial edge is added to an agenda. The agenda is a data store where edges that must undergo further processing are placed. Creating a corresponding initial edge and adding it to the agenda is indicated by block 230 in FIG. 4a. Blocks 228 and 230 thus implement rule 1a above. This processing (at blocks 222–230) is repeated until no more candidate rules identified in step 220 are left to process. This is indicated by block 232.

At this point, then, the agenda will have a number of edges placed in it. Edges are removed one at a time from the agenda and further processed according to schema rules 2a-4. This further processing includes adding the edge, or instantiations of the edge to the chart, provided that nothing is added to the chart that is subsumed by an edge already in the chart. Although not explicitly depicted in FIGS. 4A and 4B, it should be understood that adding an edge to the chart includes removing from the chart any edges already in the chart that are subsumed by the new edge. Therefore, the system begins to process the edges on the agenda by removing an edge from the agenda, as indicated by block 234. The system then assumes any immediately required words by moving the dot in the edge past any words immediately to the right of the dot. This is indicated by block 236.

The system then determines whether the resulting edge is a completed edge. This is indicated by block 238. If not, then it must be an incomplete edge. If the incomplete edge is subsumed by an edge already in the chart, as indicated by block 239, then processing continues at block 250. If the incomplete edge is not subsumed by any edge already in the chart, as indicated by block 239, then it is added to the chart and it is combined with all complete edges which unify with the nonterminal immediately to the right of the dot (as in rules 3a and 3b), and the resulting edges are added to the agenda. This is indicated by blocks 240 and 242.

If, at block 238, it is determined that the result is a completed edge, then, for each way of instantiating nonvariable LF components of the nonterminal on the left of the arrow to goal LF component subexpressions, it is determined whether the instantiated completed edge is subsumed by an edge already in the chart. This is indicated by block 245. If so, processing again continues at block 250. However, a number of steps are taken, if the instantiated edge is not subsumed by any edge already in the chart. First, the instantiated completed edge is added to the chart. This is indicated by block 244. Next, a corresponding complete edge is created. This is indicated by block 246. If this complete edge is subsumed by an edge already in the chart, as indicated by block 247, then processing continues at block 250. If this complete edge is not subsumed by any edge already in the chart, it is added to the chart as well (indicated by block 249) and it is combined with each incomplete edge having a nonterminal immediately to the right of the dot that unifies with the complete edge (as in rules 3a and 3b), adding the resultant edges to the agenda (indicated by block 248).

It can thus be seen that blocks 236–249 implement rules 2a–4. Blocks 246, 247, and 249 implement rule 4. Blocks 236–245 and block 248 implement rules 2a, 2b, 3a, and 3b in a distributed manner. Block 236 implements the feature that rules 2a and 2b have in common, namely moving the dot past any immediately required words. Blocks 242 and 248 implement the feature that rules 3a and 3b have in common, namely combining a complete edge with an incomplete edge. Blocks 239 and 240 implement the feature that rules 2a and 3a have in common, namely adding an incomplete edge to the chart. Blocks 245 and 244 implement the feature that rules 2b and 3b have in common, namely, adding a completed edge to the chart, for each way of instantiating nonvariable LF components of the nonterminal on the left of the arrow to goal LF component subexpressions.

The system then determines whether there are any additional edges left on the agenda to be processed. This is indicated by block 250. If so, processing returns to block 234 where the next edge is removed from the agenda. If not, then the system has finished building the chart, as indicated by block 252.

In accordance with one embodiment of the present invention, the steps which involve instantiating nonvariable LF components of expressions to subexpressions of goal LF components can be made more efficient if they tag the LF components so instantiated, so that copies of those LF components created by unification do not have to be examined by subsequent instances of the instantiation steps. (Since they have already been fully instantiated, they cannot be instantiated any further.)

This is particularly useful in the case of a "semantically lexicalized" grammar, which is a grammar in which only rules whose right-hand sides are empty or consist only of terminals have nonvariable LF components. The algorithm creates completed edges according to schema rules 1b, 2b, and 3b that have nonvariable LF components, but with a semantically lexicalized grammar, the nonvariable LF components of completed edges created by rules 2b and 3b, will all be copies of the nonvariable LF components of edges created by rule 1b. If those copies are all tagged as already having been instantiated to subexpressions of goal LF components, then there will be virtually no cost incurred for the instantiation feature of rules 2b and 3b. Without the tagging, each copy of an instantiated LF component would have to be rechecked by rules 2b and 3b to make sure it was equal to some goal LF component subexpression, even though no further instantiation could be performed.

Figure 5:
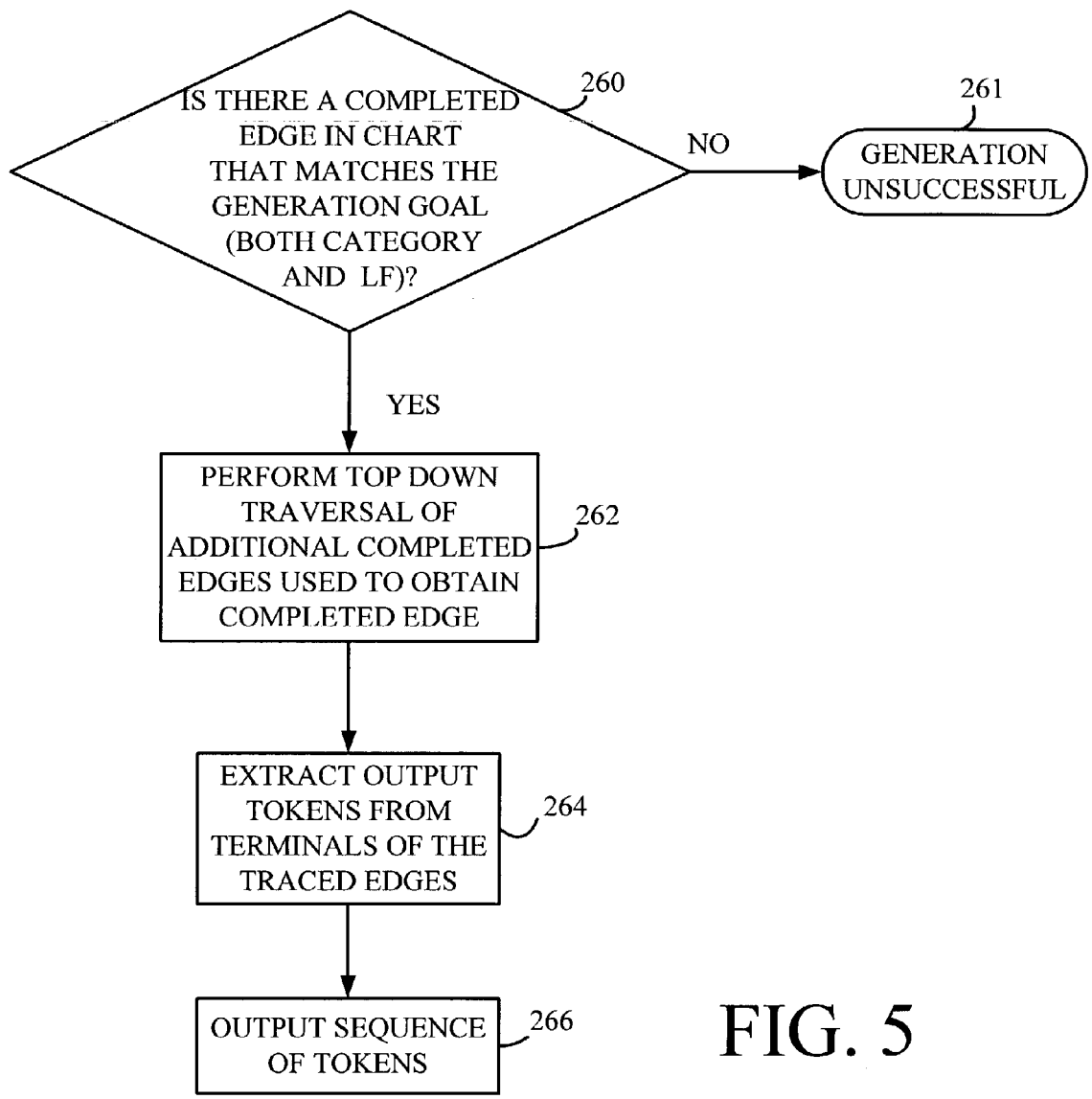
FIG. 5 is a flow diagram illustrating one embodiment of extracting an output sequence from a generated chart.

FIG. 5 is a flow diagram illustrating one embodiment of how an output sequence is realized from the chart that has been generated. The system first determines whether there is a completed edge in the chart whose nonterminal to the left of the arrow matches the generation goal (both the goal category and the goal LF). This is indicated by block 260 in FIG. 5. If, at block 260, there is no matching completed edge in the chart, then the generation has been unsuccessful. This is indicated by block 261 in FIG. 5. However, any matching completed edges will be identified.

Assume, for example, that the goal is that shown below:

s:[stype=decl]/sleep(sue)

Also, assume that the chart contains a completed edge as shown below:

⟨s:[stype=decl]/sleep(sue)→np:[prsn=3, num=sg]/sue vp: [vtype=tensed, prsn=3, num=sg, sub=sue]/sleep(sue).⟩

Because the goal and the nonterminal on the left of the arrow in the completed edge are the same in both syntactic and semantic components, the system identifies the completed edge as matching the goal. The completed edge, of course, may be derived from other completed edges. For example, the completed edge identified above indicates that it was formed by finding the illustrated noun phrase expression and the verb phrase expression. The system then looks for a nonterminal on the left of the arrow in another completed edge in the chart that matches (e.g., unifies with) each of those expressions. For example, two completed edges matching the noun phrase and verb phrase expressions could be as follows:

⟨np:[prsn=3, num=sg]/sue→'Sue'.⟩

⟨vp:[vtype=tensed, prsn=3, num=sg, sub=sue]/sleep(sue)→'sleeps'.⟩

In order to obtain the output sequence, the terminals occurring in the traversed completed edges are simply extracted in the order they occur in the edges. In this example, it can be seen that nonterminals are words, and that the first word in the output sequence is "Sue" and the second word is "sleeps" to generate a text string "Sue sleeps".

Thus, the relations between completed edges provide a way of tracing back through the entire derivation process until the output tokens can be obtained from nonterminals for the output sequence. Performing this top down traversal of the completed edges is indicated by block 262 in FIG. 5. Extracting output tokens from the terminals of the traced edges is indicated by block 264, and outputting the tokens as an output sequence is indicated by block 266. In accordance with different embodiments of the present invention, any desired number of distinct realizations of the goal may be extracted, up to the total number of realizations of the goal encoded in the chart.

Note that according to an alternative embodiment of the present invention, wherein terminals are not the final output tokens, an additional step would be added to this process in which terminals are converted to output tokens. For example, the terminals might be word stems plus morphological features, and an additional step of morphological generation could convert these into words.

It should also be noted that the present invention can be modified so that when rule 3a applies to an incomplete edge that has a "semantic head" (as defined by S. Shieber et al., *Semantic-Head-Driven Generation*, Computational Linguistics, 16(1) 30–42 (1990)), the complete edge "⟨B'⟩" must be unified with the semantic head of the incomplete edge rather than with a nonterminal immediately on the right of the dot. For example, if in an incomplete edge the nonterminal on the left of the arrow has a logical form that is a variable which is also the logical form of an element on the right of the arrow, that element is the semantic head of the edge.

This embodiment of the present invention may be more efficient in practice than the left-to-right matching implicit in rule 3a as stated initially, since the category and LF of the semantic head usually constrain the LFs of the other elements on the right of the arrow, but not vice versa. This makes the algorithm more efficient since constraints are applied earlier, eliminating useless work that is discarded by later application of the constraints. Unifying the semantic head first may require a slight change in notation to ensure that the words in the text string are generated in proper order. This could simply be done by maintaining a copy of the expressions in proper order at the end of an edge, or by simply tagging an expression indicating its original order.

The system described to this point is complete for any grammar in the unification grammar framework—that is, any grammar that is expressed in a unification grammar formalism—that has the property of being semantically monotonic. A grammar is semantically monotonic if, for every phrase admitted by the grammar, each semantic component (principal LF or LF-valued feature) of each immediate subphrase subsumes some well-formed subexpression (including the semantically null token) of some semantic component of the entire phrase. This means, in essence, that if the grammar is written in such a way that every required phrase contributes its LF to the overall LF of the goal, then the grammar is semantically monotonic.

It should also be noted that the present system can be modified slightly to accommodate certain types of logical form equivalence. In other words, the grammar may produce two different logical forms that have the same meaning. For example, the sentence "Sue sees Mary," may be specified by a particular grammar to have a logical form as follows:

[see(E),agt(E,sue),pat(E,mary)]

Where the agent of "sees" is "Sue" and the patient of "sees" is "Mary".

However, the sentence "Mary is seen by Sue," while it means the same thing but is simply expressed in the passive voice, may be specified by the same grammar to have a logical form as follows:

[see(E),pat(E, Mary),agt(E,Sue)]

In this sort of logical form, part or all of the LF may comprise a set of elements (in this case "see(E)", "agt(E,sue)" and "pat(E,mary)" whose relative order makes no difference to the meaning of the LF.

The realization algorithm as presented so far has no way of telling that these logical forms should be regarded as equivalent, so it has no way of telling that the two sentences should be regarded as paraphrases of one another; hence it has no way of telling that both sentences could be generated as realizations of either logical form.

In order to address this sort of logical form equivalence, the present system can be slightly modified such that any two special lists in an LF expression that have the same elements, separated by commas, in any order, are treated as equivalent. In the discussion below, we assume these special lists are indicated using square brackets, but any notation that distinguishes these lists may be used. The unification procedure can be slightly modified to allow two special lists to unify as if the order of the elements in the lists is irrelevant.

The algorithm specified below implements term unification, with the modification that square-bracketed lists are treated as if they are unordered; so that two terms will unify whenever any square-bracketed lists they contain could be re-ordered (possibly after further instantiation) in such a way that the resulting terms would unify using ordinary unification. The algorithm is discussed herein with reference to the Prolog programming language, using the standard notation for lists provided by Prolog, but the algorithm can be applied to any implementation or representation of lists that has the following properties:

There is a distinguished token representing the empty list, which has no elements.

For every list other than the empty list, it is possible to divide the list into a first element (which may be any term, including a variable) and a remainder, which may either be another list or a variable.

Elements of a list other than the first are accessed via the remainder of the list. Thus the second element of the list is the first element of the remainder of the list; the third element is the first element of the remainder of the remainder; etc.

Any element of a list may be a variable, but the only segment of a list that can be a variable is the final segment. This corresponds to the case where the remainder of a list, or a remainder of a remainder, etc., is a variable.

In Prolog notation, lists are delimited by square brackets, and the elements of the list are separated by commas, e.g. "[a,b,c]". For the special case where a list has a variable final segment, the variable is separated from the rest of the list by a vertical bar to indicate that it is a segment variable rather than an element variable: "[a,b|X]". (In Prolog, tokens beginning with lower case letters denote constants or functors, and those beginning with uppercase letters denote variables.)

For example, suppose "[a,g,[b,c],h,f(d,e)]" is to be unified with "[f(d,X),a,[Y,b] |Z]". These are not unifiable using ordinary unification, because corresponding elements of the lists involved have to be unifiable position by position. However, in accordance with one embodiment of the present invention the unifier can reorder the lists in "[a,g, [b,c],h, f (d,e)]" to get "[f (d,e),a, [c,b],g,h]" which will unify with "[f(d,X),a,[Y,b]|Z]" by ordinary unification, producing the following variable bindings:

X=e

Y=c

Z=[g,h]

Notice however that if "f(d,e)" were replaced with "f(e, d)", the unification would fail, because "f(d,e)" is not a list, so the order of the arguments does matter.

One embodiment of the unification algorithm builds on ordinary unification. In describing the algorithm, when ordinary unification is intended, the words "perform ordinary unification" will be explicitly used. We assume that when ordinary unification is performed, its effects are global, so that if any variables occur in the subexpressions being unified, all other occurrences of those variables are modified in accordance with the results of that unification. (This happens automatically in the Prolog implementation.)

Since it is not always possible to unify two expressions, there is a notion of success or failure associated with unification. In general, if a step of the unification algorithm fails, all variable bindings leading up to that step are assumed to be undone. (This also happens automatically in the Prolog implementation.) However, there is one nondeterministic choice point in the algorithm, indicated by an "either . . . or" construct, which interacts with the undoing of variable bindings. If the "either" branch fails, only variable bindings performed after taking that branch are undone, unless the "or" branch also fails. The subprocedure containing the nondeterministic choice succeeds if either the "either" branch or the "or" branch succeeds. In addition, in one embodiment of the present unification algorithm, there may be more than one way of unifying two expressions, and all possible combinations of taking "either" and "or" branches must be explored in order to find all solutions. (This also happens automatically in the Prolog implementation.)

One embodiment of the algorithm is described below in terms of three mutually recursive procedures. Procedure 1 handles the general case of unifying a pair of terms that may contain lists to be reordered. This is the top-level procedure that is called from the outside. Procedure 2 handles the specific case of unifying a pair of terms that have been identified as being lists. Procedure 3 attempts to unify a term with a nondeterministically chosen element of a list.

Procedure 1
 To unify the pair of terms X and Y, with list reordering:
  If either X or Y is a variable:
   Perform ordinary unification of X and Y.
  Otherwise, if X and Y are both lists:
   If possible, unify the pair of lists X and Y, with reordering, using Procedure 2.
   Otherwise, fail.
  Otherwise, if X and Y have the same principal functor:
   If possible, for each pair of terms consisting of corresponding arguments of X and Y:
    Unify the pair of terms, with list reordering, using Procedure 1.
   Otherwise, fail.
  Otherwise, fail.

Procedure 2
 To unify the pair of lists X and Y, with reordering:
  If either X or Y is an empty list:
   If possible, perform ordinary unification of X and Y.
   Otherwise, fail.
  Otherwise:
   Try to unify the term which is the first element of X with one of the elements of Y, using Procedure 3.
   If Procedure 3 succeeds:
    Let U be the remainder of X, and let V be the list of remaining elements of Y returned by Procedure 3.
    If either U or V is a variable:
     Perform ordinary unification of U and V.
    Otherwise:
     If possible, unify the pair of the lists U and V, with reordering, using Procedure 2.
     Otherwise, fail.
   Otherwise, fail.

Procedure 3
 To unify a term E with one of the elements of a list X:
  If X is a variable:
   Perform ordinary unification of X and a new list whose first element is E, and whose remainder is a new variable Y, and return Y as the list of remaining elements of X.
  Otherwise:
   Let F be the first element of X, and let Y be the remainder of X.
   If possible:
    Either unify the pair of terms E and F, with list reordering, using Procedure 1, and return Y as the list of remaining elements of X.
    Or unify the term E with one of the elements of the list Y, using Procedure 3, and return F followed by the remaining elements of Y as the list of remaining elements of X.
   Otherwise, fail.

In addition, for the realization algorithm to treat LF expressions containing special, square-bracketed lists of the same elements in different orders as equivalent, the system must be slightly modified in the step where all well-formed subexpressions of the goal LF components are enumerated. When enumerating these well-formed subexpressions, the system must add to that enumeration all the subsets of the square-bracketed lists, keeping the elements in the same order. For example, if an expression includes the list "[a,b,c,d]", then all subsets of the list must be enumerated, keeping those elements in the same order such as:
 [a,b,c]
 [a,b,d]
 [a,c,d]
 [a,b]
 [a,c]
 [a,d]
 [b,c,d]
 [b,c]
 [b,d]
 [c,d]
 [a]
 [b]
 [c]
 [d]

With these two slight modifications (enumerating the subsets of special lists and modifying the unification procedures to unify two special lists having the same elements in any order) the system will accommodate logical form equivalence of the sort that can be represented in terms of irrelevance of the order of elements in lists.

It can thus be seen that the present invention is driven by the structure of the grammar rules, rather than by the structure of the semantic representations. Therefore, semantic representations in substantially any notation expressible within the grammar formalism can be accommodated by the present invention. In contrast, other approaches that can accommodate certain logical form equivalences are substantially restricted to "flat" semantic representations, wherein the entire semantic representation must comprise only a single list of simple semantic representations. The present invention can be applied either to flat representations or to structured representations incorporating complex, nested structures.

Examples of prior art that can accommodate certain logical form equivalences, but are substantially restricted to flat semantic representations include: C. Brew, *Letting the Cat Out of the Bag: Generation for Shake-and-Bake MT*, Proceedings of the 14th International Conference on Computational Linguistics, pp. 610–616, Nantes, France (1992); M. Kay, *Chart Generation*, Proceedings of the 34th Annual Meeting of the Association for Computational Linguistics, pp. 200–204, Santa Cruz, Calif. (1996); J. Carroll, et al., *An Efficient Chart Generator for (Semi-)Lexicalist Grammars*, Proceedings of the 7th European Workshop on Natural Language Generation, pp. 86–95, Toulouse, France (1999).

Carroll et al. assert; without providing a detailed method, that their approach can be generalized to work with non-flat semantic representations, provided that certain procedures are modified to work with the alternative representations. The present invention, in contrast, provides a uniform process that works with a variety of flat and structured representations without modification.

In contrast to the Shieber algorithm, the present invention is based on a bottom-up chart generation technique rather than a top-down prediction technique. This eliminates top-down prediction as a source of complexity in the algorithm that in practice has little or no beneficial effect.

In addition, the present invention instantiates every nonvariable LF component of the expression representing the overall grammatical category and meaning (i.e., the nonterminal on the left of the arrow, in the present notation) of every completed edge (and therefore every complete edge). This has two significant advantages. First, it reduces the number of possible distinct completed and complete edges under consideration, over those generated in, for example, the Shieber algorithm. This is because Shieber will not only allow every actually instantiated edge, but will also allow all possible generalizations of that instantiation. Second, this technique reduces the number of LF expressions that must be examined to ensure compatibility with the goal LF component. Since an LF expression cannot change once it is fully instantiated, if each instantiated LF expression is tagged as being a goal LF subexpression, no further checks need to be made against that LF expression. However, in other systems, such as the Shieber algorithm, LF expressions that remain only partly instantiated must be re-checked as they are percolated from edge to edge by unification, since they might become further instantiated in ways incompatible with any goal LF subexpression.

The present system also makes allowance for semantically null constituents. Further, the present invention takes into account LF-valued features in addition to the principal LF expression. These LF-valued features can be used to carry semantic information that is not used locally, up the analysis tree, even where it does not form part of the principal part of the principal LF of an immediate parent.

Although the present invention has been described with reference to particular embodiments, workers skilled in the art will recognize that changes may be made in form and detail without departing from the spirit and scope of the invention.

What is claimed is:

1. A method of realizing, in accordance with a grammar, one or more output sequences meeting requirements specified by a generation goal, the method comprising:
   receiving the generation goal, wherein the generation goal incorporates semantic representation components;
   constructing a store of edges in accordance with the grammar, wherein:
      the grammar comprises a specification of any of a plurality of structured semantic representations and flat semantic representations of meanings of output sequences;
      constructing the store of edges in accordance with the grammar is a uniform process with respect to the plurality of structured semantic representations and flat semantic representations of meanings of output sequences;
      constructing the store of edges in accordance with the grammar comprises combining edges already in the store of edges, wherein:
      the store of edges comprises a set of incomplete edges; and
      the store of edges comprises a set of combinable edges, wherein:
         each combinable edge specifies a nonterminal specifying an overall grammatical category and meaning for the combinable edge, the nonterminal incorporating semantic representation components;
         the combinable edges in the store of edges are substantially the only edges specifying nonterminals that are combined with incomplete edges, in constructing the store of edges in accordance with the grammar;
         all nonvariable semantic representation components of the nonterminal specifying the overall grammatical category and meaning of each combinable edge have been instantiated to well-formed subexpressions of the semantic representation components of the generation goal; and
   extracting the output sequences meeting the requirements specified by the generation goal from the store of edges.

2. The method of claim 1, wherein the well-formed subexpressions of the semantic representation components of the generation goal are stipulated to comprise:
   a semantically null token corresponding to semantically null output.

3. The method of claim 1, wherein each nonterminal comprises:
   a grammatical category; and
   a principal semantic representation component.

4. The method of claim 3, wherein:
   the store of edges comprises a set of completed edges;
   each completed edge comprises:
      a first part specifying a nonterminal; and
      a second part specifying a possibly empty sequence of terminals and nonterminals.

5. The method of claim 4, wherein each incomplete edge comprises:
   a first part specifying a nonterminal;
   a second part specifying a possibly empty sequence of terminals and nonterminals; and
   a third part specifying a nonempty sequence of terminals and nonterminals.

6. The method of claim 5, wherein:
   the grammar comprises a set of rules; and
   each grammar rule comprises:
      a first part specifying a nonterminal; and
      a second part specifying a possibly empty sequence of terminals and nonterminals.

7. The method of claim 6, wherein constructing the store of edges in accordance with the grammar comprises:
   attempting to identify possible edges derivable from grammar rules or derivable from edges already in the store of edges; and
   whenever a possible edge is identified, ensuring that the store of edges contains an edge corresponding to the identified possible edge.

8. The method of claim 7, wherein ensuring that the store of edges contains an edge corresponding to the identified possible edge comprises:
   determining whether the store of edges already contains an edge corresponding to the identified possible edge; and
   if not, adding the identified possible edge to the store of edges.

9. The method of claim 8, wherein the store of edges already containing an edge corresponding to the identified possible edge comprises:

the store of edges already containing an edge that subsumes the identified possible edge.

10. The method of claim 8, wherein adding the identified possible edge to the store of edges comprises:
identifying edges already in the store of edges that are subsumed by the identified possible edge; and
removing from the store of edges the identified edges already in the store of edges that are subsumed by the identified possible edge.

11. The method of claim 7, wherein attempting to identify a possible edge derivable from grammar rules comprises:
attempting to identify a rule in the grammar that can contribute to realizing output sequences meeting the requirements of the generation goal and, if successful, deriving the identified possible edge from the rule.

12. The method of claim 11, wherein attempting to identify a rule in the grammar that can contribute to realizing output sequences meeting the requirements of the generation goal and, if successful, deriving the identified possible edge from the rule comprises:
selecting a candidate rule from the grammar; and
determining whether the candidate rule can contribute to realizing output sequences meeting the requirements of the generation goal and, if so, deriving the identified possible edge from the candidate rule.

13. The method of claim 12, wherein selecting a candidate rule from the grammar comprises:
selecting as the candidate rule, a rule from the grammar having an atomic semantic representation token occurring in a semantic representation component of the goal as the rarest atomic semantic representation token occurring in the rule.

14. The method of claim 12, wherein determining whether the candidate rule can contribute to realizing output sequences meeting the requirements of the generation goal and, if so, deriving the identified possible edge from the candidate rule comprises:
if the sequence specified by the second part of the candidate rule contains at least one nonterminal:
determining whether it is possible to instantiate all nonvariable semantic representation components of the candidate rule to well-formed subexpressions of the semantic representation components of the generation goal;
if so, letting the identified possible edge be a new incomplete edge wherein:
the first part of the new incomplete edge specifies the same nonterminal as the first part of the candidate rule;
the second part of the new incomplete edge specifies an empty sequence of terminals and nonterminals;
the third part of the new incomplete edge specifies the same sequence of terminals and nonterminals as the second part of the candidate rule;
if the sequence specified by the second part of the candidate rule does not contains at least one nonterminal:
constructing a new completed edge wherein:
the first part of the new completed edge specifies the same nonterminal as the first part of the candidate rule;
the second part of the new completed edge specifies the same sequence of terminals and nonterminals as the second part of the candidate rule; and if possible:
letting the identified possible edge be a completed edge appropriately instantiating the new completed edge.

15. The method of claim 14, wherein attempting to identify a possible edge derivable from edges already in the store of edges comprises:
selecting an incomplete edge already in the store of edges, wherein the sequence specified by the third part of the selected incomplete edge has an initial subsequence consisting of terminals;
if the initial subsequence constitutes the entire sequence:
constructing a new completed edge wherein:
the first part of the new completed edge specifies the same nonterminal specified by the first part of the selected incomplete edge;
the second part of the new completed edge specifies a sequence consisting of a concatenation of the sequence specified by the second part of the selected incomplete edge and the initial subsequence;
if possible:
letting the identified possible edge be a completed edge appropriately instantiating the new completed edge;
if the initial subsequence does not constitute the entire sequence:
letting the identified possible edge be a new incomplete edge wherein:
the first part of the new incomplete edge specifies the same nonterminal specified by the first part of the selected incomplete edge;
the second part of the new incomplete edge specifies a sequence consisting of a concatenation of the sequence specified by the second part of the selected incomplete edge and the initial subsequence; and
the third part of the new incomplete edge specifies a sequence of elements following the initial subsequence in the sequence specified by the third part of the selected incomplete edge.

16. The method of claim 15, wherein attempting to identify a possible edge derivable from edges already in the store of edges comprises:
selecting an incomplete edge already in the store of edges;
selecting a combinable edge already in the store of edges; and
deriving the identified possible edge by combining, if possible, the selected incomplete edge and the selected combinable edge.

17. The method of claim 16, wherein deriving the identified possible edge by combining, if possible, the selected incomplete edge and the selected combinable edge comprises:
attempting to match the nonterminal specifying the overall grammatical category and meaning for the combinable edge with an initial element of the sequence of terminals and nonterminals specified by the third part of the incomplete edge;
if successful:
if the initial element of the sequence constitutes the entire sequence:
constructing a new completed edge wherein:
the first part of the new completed edge specifies the same nonterminal specified by the first part of the selected incomplete edge;

the second part of the new completed edge specifies a sequence consisting of a concatenation of the sequence specified by the second part of the selected incomplete edge and the matched nonterminal;
if possible:
letting the identified possible edge be a completed edge appropriately instantiating the new completed edge;
if the initial element of the sequence does not constitute the entire sequence:
letting the identified possible edge be a new incomplete edge wherein:
the first part of the new incomplete edge specifies the same nonterminal specified by the first part of the selected incomplete edge;
the second part of the new incomplete edge specifies a sequence consisting of a concatenation of the sequence specified by the second part of the selected incomplete edge and the matched nonterminal; and
the third part of the new incomplete edge specifies a sequence of elements following the initial element in the sequence specified by the third part of the selected incomplete edge.

18. The method of claim 17, wherein:
each combinable edge comprises a completed edge, wherein:
the nonterminal specifying the overall grammatical category and meaning for the combinable edge comprises the nonterminal specified by the first part of the completed edge;
the completed edge appropriately instantiating the new completed edge comprises the new completed edge instantiating, if possible, all nonvariable semantic representation components of the nonterminal specified by the first part of the new completed edge to well-formed subexpressions of the semantic representation components of the generation goal.

19. The method of claim 17, wherein:
the store of edges comprises a set of complete edges;
each complete edge specifies a nonterminal; and
each combinable edge comprises a complete edge, wherein:
the nonterminal specifying the overall grammatical category and meaning for the combinable edge is the nonterminal specified by the completed edge.

20. The method of claim 19, wherein the completed edge appropriately instantiating the new completed edge comprises:
the new completed edge instantiating, if possible, all nonvariable semantic representation components of the nonterminal specified by the first part of the new completed edge to well-formed subexpressions of the semantic representation components of the generation goal.

21. The method of claim 20, wherein attempting to identify a possible edge derivable from edges already in the store of edges comprises:
selecting a completed edge from the store of edges; and
letting the identified possible edge be a complete edge specifying the nonterminal specified by the first part of the completed edge.

22. The method of claim 19, wherein the completed edge appropriately instantiating the new completed edge comprises:
the new completed edge.

23. The method of claim 22, wherein attempting to identify a possible edge derivable from edges already in the store of edges comprises:
selecting a completed edge from the store of edges;
constructing a complete edge specifying the nonterminal specified by the first part of the completed edge;
if possible:
instantiating all nonvariable semantic representation components of the nonterminal specified by the new complete edge to well-formed subexpressions of the semantic representation components of the generation goal; and
letting the identified possible edge be the instantiated new complete edge.

24. The method of claim 1, wherein instantiating all nonvariable semantic representation components of a nonterminal comprises:
tagging all semantic representation components being instantiated as having been instantiated; and
skipping all semantic representation components previously tagged as having been instantiated.

25. The method of claim 17, wherein instantiating all nonvariable semantic representation components of a nonterminal to well-formed subexpressions of the semantic representation components of the generation goal comprises:
simultaneously unifying all nonvariable semantic representation components of the nonterminal with well-formed subexpressions of the semantic representation components of the generation goal.

26. The method of claim 25, wherein instantiating all nonvariable semantic representation components of a grammar rule to well-formed subexpressions of the semantic representation components of the generation goal comprises:
simultaneously unifying all nonvariable semantic representation components of the grammar rule with well-formed subexpressions of the semantic representation components of the generation goal.

27. The method of claim 26, wherein:
matching a nonterminal with an element of a sequence of terminals and nonterminals comprises:
unifying the nonterminal with the element of the sequence.

28. The method of claim 27, wherein:
semantic representation components may incorporate special lists of elements, wherein:
each special list of elements has an order; and
the order of elements is irrelevant to the meaning of the special list.

29. The method of claim 28, wherein unifying two expressions incorporating semantic representation components comprises:
unifying the expressions whenever any special lists the semantic representation components incorporate could be re-ordered (possibly after further instantiation) in such a way that the resulting expressions would unify using ordinary unification.

30. The method of claim 29, wherein the well-formed subexpressions of a semantic representation component are stipulated to comprise:
all special lists consisting of subsets of the elements of each special list that is a subexpression of the semantic representation component, such that the elements in the list consisting of the subset are in the same order as in the special list that is the subexpression of the semantic representation component.

31. The method of claim 4, wherein extracting an output sequence from the store of edges comprises:
finding a root edge, comprising a completed edge in the store that matches the generation goal;
starting from the root edge, recursively traversing the completed edges in the store by matching nonterminals in the sequence specified by the second part of a completed edge with nonterminals specified by the first parts of other completed edges;
collecting all terminals encountered in the traversal into a sequence of terminals in an order specified by the completed edges; and
letting the output sequence be a sequence of output tokens corresponding to the terminals in the order of the sequence of terminals.

32. The method of claim 31, wherein:
each terminal is an output token; and
the output token corresponding to each terminal is the terminal.

33. The method of claim 31, wherein:
each output token is a word.

34. The method of claim 33, wherein:
each terminal comprises a word stem plus morphological features; and
the output token corresponding to each terminal is the word realizing the word stem plus morphological features comprised by the terminal.

35. The method of claim 31, wherein:
the generation goal comprises a principal semantic representation component; and
matching the root edge with the generation goal comprises:
matching the principal semantic representation component of the nonterminal specified by the first part of the root edge with the principal semantic representation component of the generation goal.

36. The method of claim 35, wherein:
the generation goal comprises a grammatical category; and
matching the root edge with the generation goal comprises:
matching the grammatical category of the nonterminal specified by the first part of the root edge with the grammatical category of the generation goal.

37. The method of claim 35, wherein matching the root edge with the generation goal comprises:
matching the grammatical category of the nonterminal specified by the first part of the root edge with a fixed grammatical category.

* * * * *